United States Patent [19]

Hieda et al.

[11] Patent Number: 5,175,624
[45] Date of Patent: Dec. 29, 1992

[54] VIDEO SYSTEM HAVING IMAGE COMBINING FUNCTION

[75] Inventors: Teruo Hieda; Koji Takashi; Yoshihiro Nakatani; Yoshifumi Ishikawa; Takeshi Abe; Kenji Kyuma; Koichiro Suzuki, all of Kanagawa, Japan

[73] Assignee: Canon Kabushiki Kaisha, Tokyo, Japan

[21] Appl. No.: 678,668

[22] Filed: Apr. 1, 1991

[30] Foreign Application Priority Data

Apr. 3, 1990 [JP] Japan .................... 2-089411

[51] Int. Cl.⁵ .......................................... H04N 5/265
[52] U.S. Cl. .................... 358/183; 358/903; 358/906
[58] Field of Search ........... 358/183, 182, 22, 185, 358/906, 209, 909

[56] References Cited

U.S. PATENT DOCUMENTS

| | | | |
|---|---|---|---|
| 4,155,095 | 5/1979 | Kirschner | 358/22 |
| 4,477,830 | 10/1984 | Lindman et al. | 358/183 |
| 4,717,971 | 1/1988 | Sawyer | 358/903 |
| 4,858,012 | 8/1989 | Hino et al. | 358/909 |
| 4,908,700 | 3/1990 | Ishii et al. | 358/183 |
| 5,010,406 | 4/1991 | Kawakami et al. | 358/183 |
| 5,040,066 | 8/1991 | Arbeiter et al. | 358/183 |
| 5,093,731 | 3/1992 | Watanabe | 358/909 |

FOREIGN PATENT DOCUMENTS 0051774 2/1989 Japan.
0029472 2/1991 Japan.

Primary Examiner—James J. Groody
Assistant Examiner—Jeffrey S. Murrell
Attorney, Agent, or Firm—Robin, Blecker, Daley & Driscoll

[57] ABSTRACT

A video system is constructed of an auxiliary unit and a primary unit. The auxiliary unit includes a memory for storing a plurality of image data corresponding to an area occupying a portion of one picture, a plurality of location data indicative of the respective locations of the plurality of image data in the one picture and a plurality of color data indicative of respective colors relative to the plurality of image data. The primary unit includes an inputting circuit for inputting a first color video signal, a forming circuit for forming a second color video signal according to the plurality of image data, the plurality of location data and the plurality of color data which are supplied from the auxiliary unit and a combining circuit for combining the first video signal with the second video signal. The video system is capable of producing a variety of comined images with a relatively small memory capacity.

16 Claims, 5 Drawing Sheets

F I G. 1
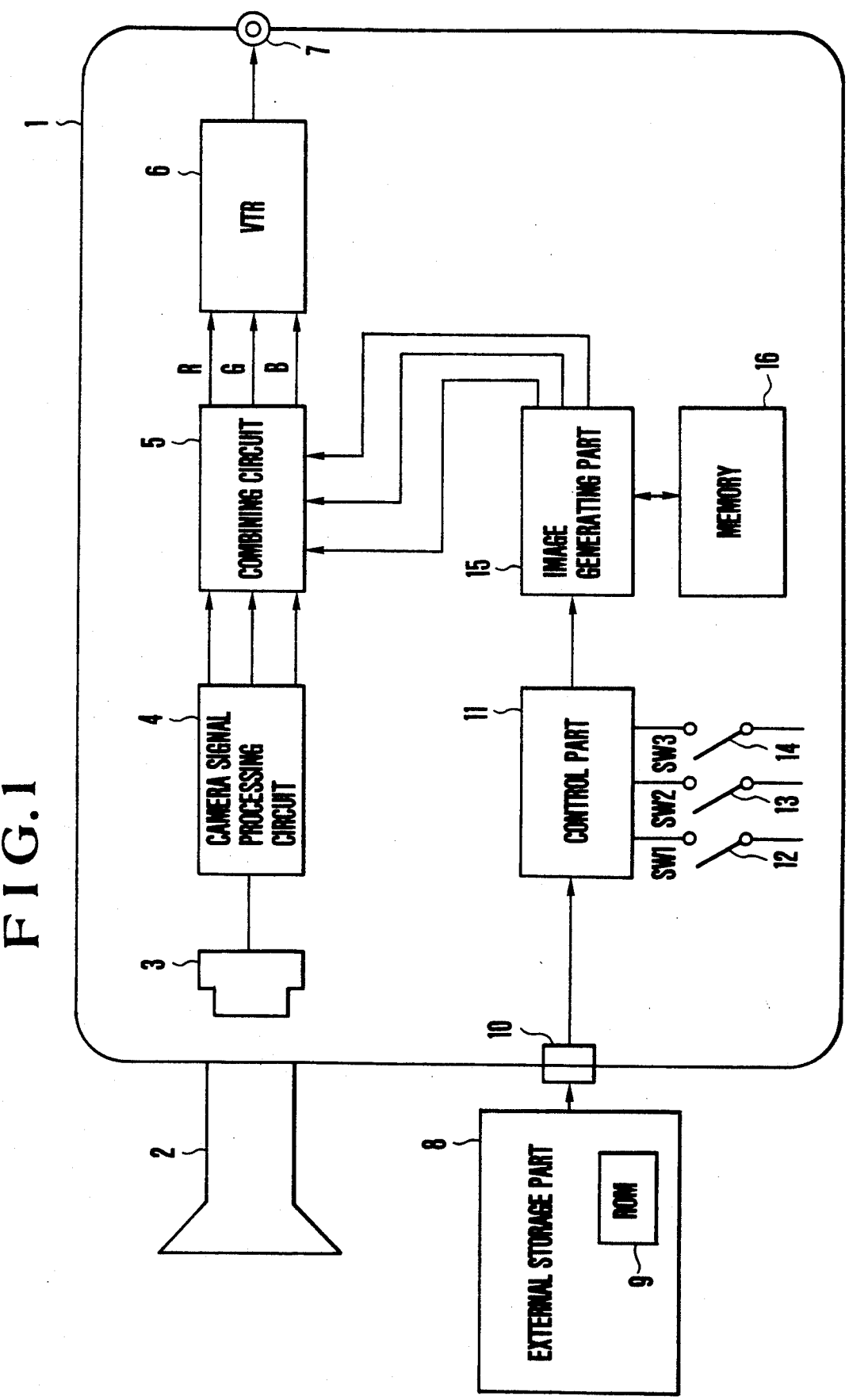

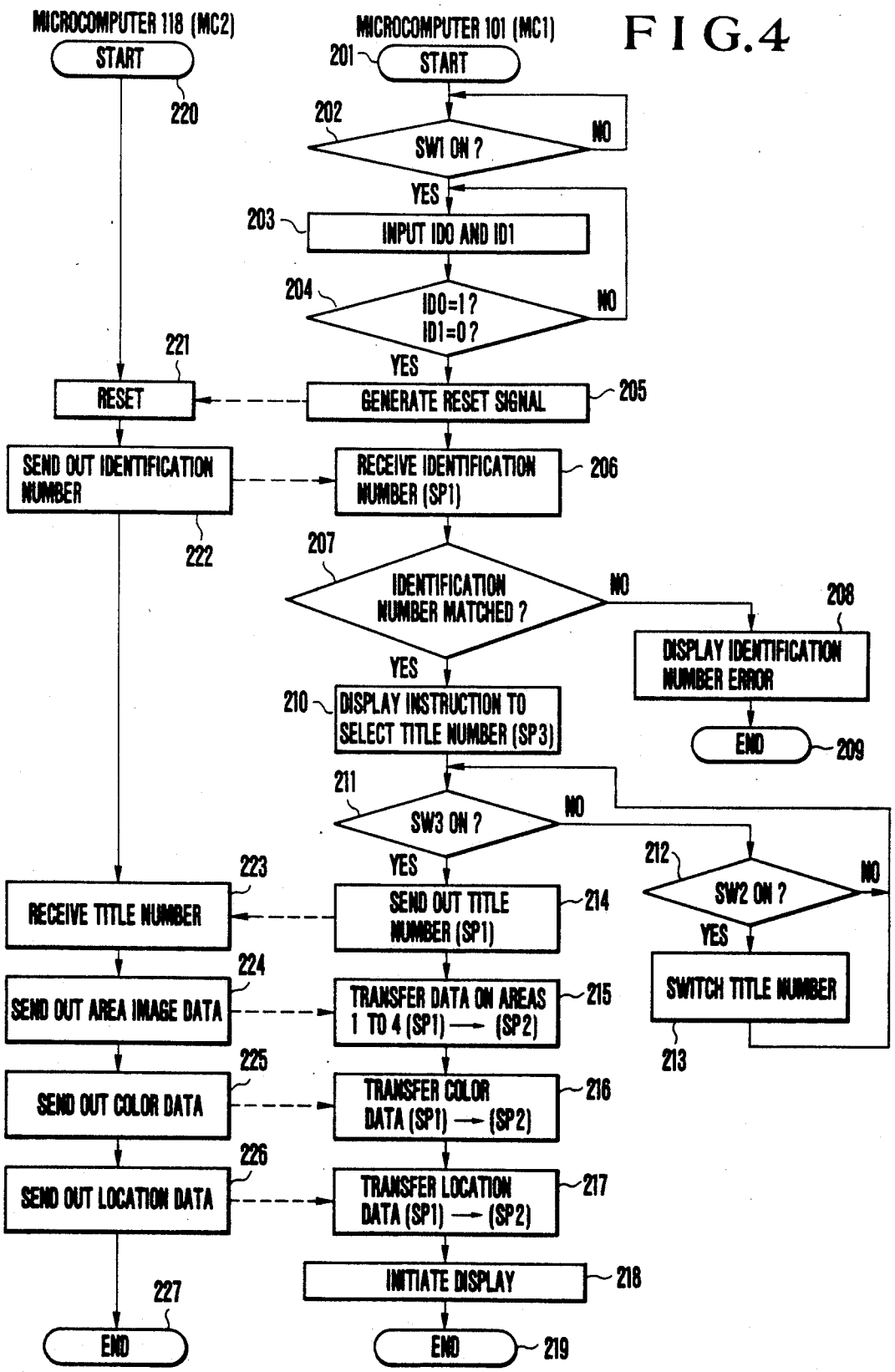

VIDEO SYSTEM HAVING IMAGE COMBINING FUNCTION

BACKGROUND OF THE INVENTION

1. Field of the Invention

The present invention relates to a video system and, more particularly, to a system for combining a predetermined image with an arbitrary image.

2. Description of the Related Art

It is known that a conventional device of this kind is arranged to superimpose an image such as a character, a symbol or a graphic image on an image which is being recorded as a video signal during photography using a video camera, in order to record information such as the date, time and place of the photography or to enhance image effects. A large number of such superimposing techniques have heretofore been known.

For example, a system utilizing what is called a character generator is widely used. The character generator typically comprises a pattern ROM (read-only memory) in which display patterns such as characters and symbols are stored, a register which stores the kind of character to be displayed at each display position, and a reading part for reading the contents of the pattern ROM corresponding to the contents of the register in accordance with horizontal and vertical synchronizing signals and combining the read contents with a video signal. A microcomputer or the like writes the kind of character to be displayed to a register present at a desired display position, whereby the desired character is displayed.

A second example is a system which quantizes an imaged signal by an A/D converter by using a code of the order of one to several bits and stores a quantized signal in a memory for each display pixel. When a display operation is to be performed, the contents of the memory are sequentially read in accordance with the horizontal and vertical synchronizing signals of the imaged signals, and combined with a video signal.

A third example is a system which comprises a graphics memory corresponding to each display pixel in a picture, a microcomputer for writing display data to the graphics memory, and a reading circuit for reading the contents of the graphics memory. The microcomputer writes the display data to the graphics memory in accordance with a program, and the reading circuit reads the written data in accordance with horizontal and vertical synchronizing signals. The read signal is combined with a video signal.

However, each of the conventional examples described above has the following disadvantage.

In the system utilizing the character generator, the kinds and sizes of display characters and display symbols and the position where they can be displayed are limited. This system, therefore, has practical limitations in that it is only utilized for recording the abovedescribed specific kinds of information.

In the second example, since image data on each pixel is stored in a memory, the body of the system requires a large-capacity memory, and a character or graphic image to be displayed needs to be drawn on paper or the like in advance. This system still has practical limitations in that it is impossible to always perform image combination by an easy operation.

In the third example, a graphics memory is needed for each pixel, so that the required memory capacity is extremely large. Since an image is drawn on the graphics memories by the microcomputer, a high-performance microcomputer is needed.

If a moving image is displayed, the first example will encounter the problem that the displayed image can only be moved within a limited range, and the second example will encounter the problem that the displayed image is difficult to move partially, i.e., it can only be scrolled. In the case of the third example, since the number of times of computations by the microcomputer is enormous, a microcomputer capable of performing higher-speed computations is needed.

SUMMARY OF THE INVENTION

It is, therefore, an object of the present invention to solve the above-described problems.

Another object of the present invention is to provide a video system in which the capacity of a memory to be disposed in a main unit can be made relatively small and which can produce a variety of combined images.

To achieve the above-described objects, according to one aspect of the present invention, there is provided a video system which comprises an auxiliary unit including a memory for storing image data corresponding to an area occupying a portion of one picture and location data indicative of the location of the image data in the one picture and a primary unit to which the auxiliary means is removably secured, the primary unit including inputting means for inputting a first video signal, forming means for forming a second video signal according to the image data and the location data supplied from the auxiliary unit, and combining means for combining the first video signal with the second video signal.

The above and other objects, features and advantages of the present invention will become apparent from the following detailed description of a preferred embodiment of the present invention, taken in conjunction with the accompanying drawings.

BRIEF DESCRIPTION OF THE DRAWINGS

FIG. 1 is a schematic block diagram showing the entire arrangement of one embodiment of a system according to the present invention;

FIG. 4 is a flowchart which is used for explaining the operations of the respective microcomputers shown in FIG. 3.

DETAILED DESCRIPTION OF THE PREFERRED EMBODIMENT

Figure 2C:
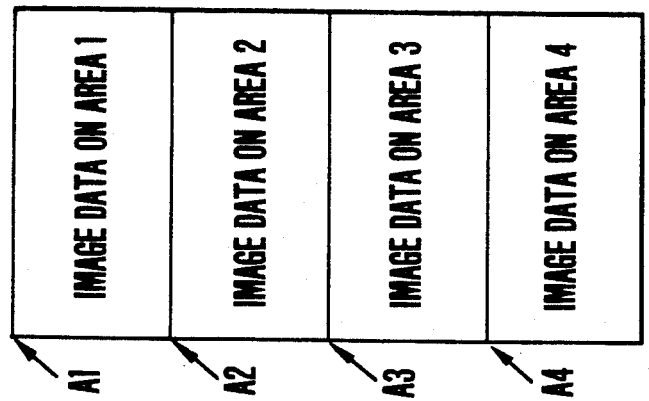
FIGS. 2(a), 2(b), 2(c), 2(d), 2(e) and 2(f) are schematic views which are used for explaining the operation of the system shown in FIG. 1.

FIG. 1 is a schematic block diagram showing the arrangement of one embodiment of a system according to the present invention.

The system of FIG. 1 which serves as a VTR. integrated camera comprises a body (main unit) 1, an imaging lens 2, an image sensor 3, a camera signal processing circuit 4, a combining circuit 5 for combining a video signal with a title image signal, a video tape recorder (VTR) 6, a video output terminal 7, an external storage part (auxiliary unit) 8 in which data for title images are stored, a read-only memory (ROM) 9 in which title data (to be described later) are written and which is incorporated in the external storage part 8, a connection part 10 for effecting a removable connection between the external storage part 8 and the body 1, a control part 11 for performing various control operations, such as the reading of data from the external storage part 8 and control of switches, switches 12, 13 and 14, an image generating part 15 for generating a title image signal, and a read/write memory 16 for holding image data contained in title data.

A subject image (not shown) is focused onto the image sensor 3 by the imaging lens 2, photoelectrically converted by the image sensor 3, and subjected to signal processing in the camera signal processing circuit 4. The resultant video signal (RGB signals in the present embodiment) is combined with a title image signal in the combining circuit 5 as will be described later, and recorded by the VTR 6. During reproduction from the VTR 6, the reproduced video signal is coupled to external equipment such as a television monitor via the output terminal 7.

In the meantime, the title data stored in the ROM 9 is inputted from the external storage part 8 to the control part 11 via the connection part 10. The control part 11 sends the title data to the image generating part 15 in accordance with the states of the switches 12 to 14. The image generating part 15 writes the input data to the memory 16. Also, the image generating part 15 reads out data from the memory 16 in accordance with a command sent from the control part 11 and generates a title image signal. As described above, the title image signal is combined with the aforesaid video signal in the combining circuit 5. Since the connection part 10 is arranged to make a removable connection, the external storage part 8 may be replaced with other kinds of storage elements.

FIGS. 2(a) to 2(f) are schematic views showing the operation of the present embodiment.

Figure 2B:
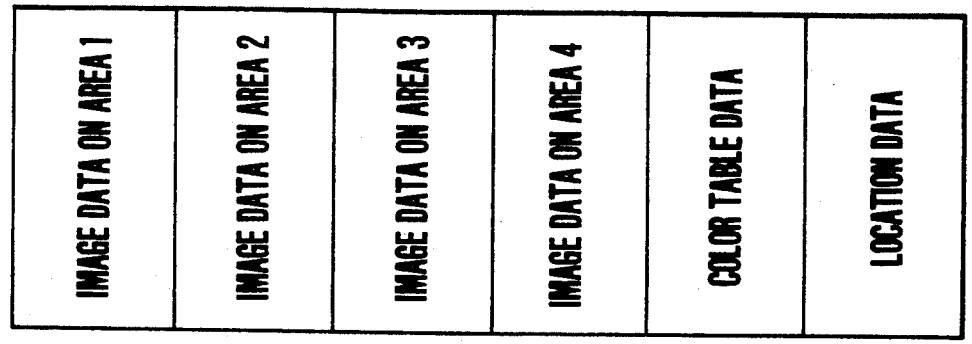
Figure 2A:
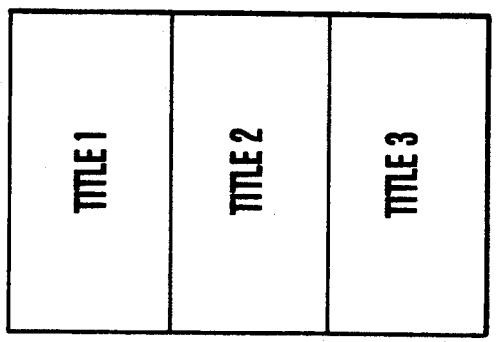

FIG. 2(a) shows the contents of data stored in the ROM 9. As shown, title data corresponding to a plurality of titles are stored in the ROM 9. By way of example, FIG. 2(a) shows that three title data corresponding to titles 1 to 3 are stored in the ROM 9. These data may be stored in the ROM 9 in original form. Otherwise, such data may be stored in the ROM 9 with the amount of information compressed during a writing process by means of a data compression algorithm, and during data reading, the data may be restored by decompressing the amount of information.

FIG. 2(b) shows the contents of each of the title data shown in FIG. 2(a). Each title data consists of: a plurality of area image data corresponding to a plurality of areas in a picture, each of the area image data including one-bit image data each representing a respective one of the pixels contained in the associated area; color table data for determining a color to be displayed for each area; and location data indicative of the position of each area in an actual picture. In the example shown in FIG. 2(b), the number of areas is four.

FIG. 2(c) shows the contents of data which are to be stored in the memory 16. As can be seen from FIG. 2(c), only the area image data of the title data are written to the memory 16 via the control part 11 and the image generating part 15.

Figure 2D:
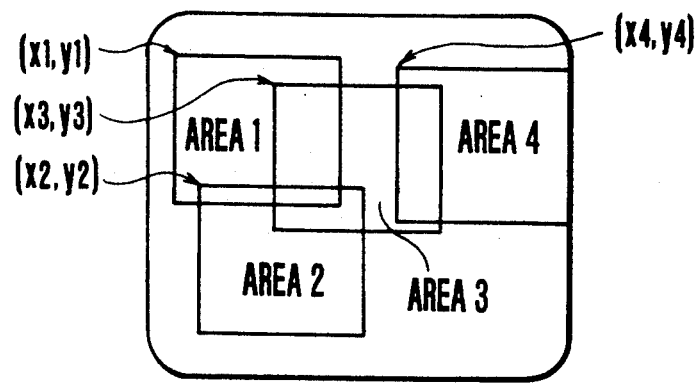
Figure 2E:
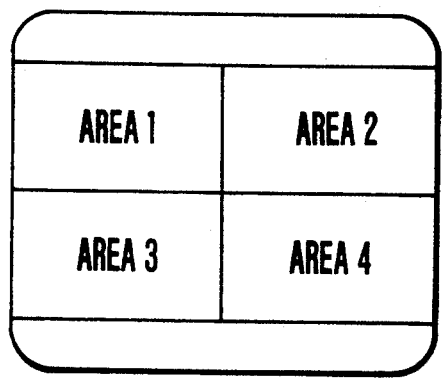
Figure 2F:
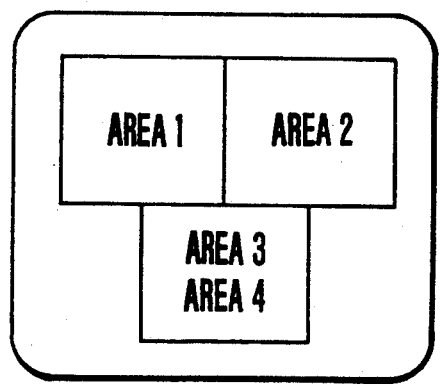

FIGS. 2(d), 2(e) and 2(f) show different examples of positions where the aforesaid plurality of areas are displayed when the video signal outputted from the output terminal 7 is displayed as a visual image on a television screen. As in the example of FIG. 2(b), the display example of each of FIGS. 2(d) consists of four areas. If the size of each area is approximately one-half to one-eighth that of the screen, a displayed image can occupy a sufficient area and an increase in memory capacity can be prevented. In the present embodiment, it is assumed that the size of each area is approximately one-fourth that of the overall screen and that each area is similar in shape to the overall screen. It is also assumed that the aforesaid location data is indicative of the coordinates (Xi, Yi) (i = 1, 2, 3 or 4) of the top left position of each area. These areas may be displayed in a dispersed or overlapped manner. In the present embodiment of the system, display colors are determined by the extent to which the areas are overlapped. That is to say, if the areas are not overlapped, one color can be used for each of the areas. Also, a maximum of three colors can be displayed for a portion where two areas are overlapped, a maximum of seven colors for a portion where three areas are overlapped, or a maximum of fifteen colors for a portion where all of the four areas are overlapped.

FIG. 2(e) shows a state where the areas are located in a dispersed manner. In this case, as described above, one color for each area, i.e., a total of four colors, can be used. The color in which image data on each area is displayed is determined on the basis of the color table data of FIG. 2(b).

FIG. 2(f) shows a state where areas 1, 2 and 3 are not overlapped on one another and the area 3 and an area 4 are located to form a substantially identical area. In this case, image data on the areas 1 and 2 are displayed in one color each, while a maximum of three colors are displayed in the region in which the areas 3 and 4 are overlapped, as described above. The color which is displayed for each of the areas is determined on the basis of the color table data, as described above. For example, if it is assumed that each area image data on a certain pixel in the areas 3 and 4 is represented by "1" or "0", three colors will be displayed in accordance with three combinations: (1) "1" (area 3) and "0" (area 4); (2) "0" (area 3) and "1" (area 4); and "1" (area 3) and "1" (area 4). As described later in detail, a color corresponding to any one of the aforesaid combinations is selected in accordance with the color table data which is transmitted to the image generating part 15 from the ROM 9 of the external storage part 8, and the selected color is used as a color for a title image signal.

Figure 3:
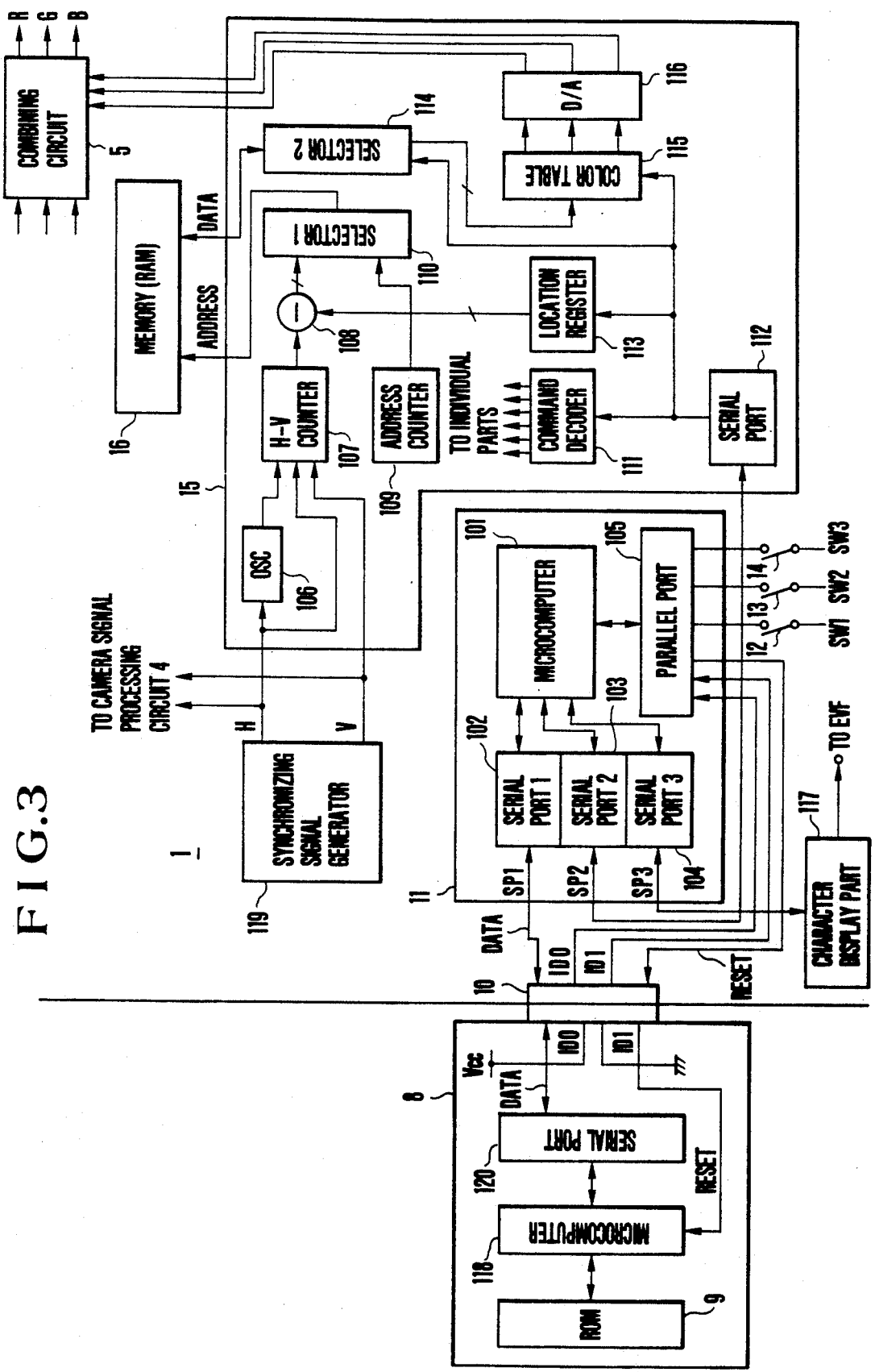
FIG. 3 is a block diagram showing a specific example of the arrangement of the essential portions of the system shown in FIG. 1.

FIG. 3 is a block diagram showing a specific example of the arrangement of the essential portions of the system shown in FIG. 1. In FIG. 3, since the details of the camera signal processing circuit 4 and the VTR 6 are known, their illustration is omitted, and like reference numerals are used to denote elements which correspond to or are identical in function to those shown in FIG. 1.

The arrangement shown in FIG. 3 comprises microcomputers 101 and 118, serial ports 102, 103, 104, 112 and 120, a parallel port 105, an externally synchronous type of oscillator 106, an H–V counter 107 for receiving the output signal of the oscillator 106 as well as horizontal and vertical synchronizing signals which are generated by a synchronizing signal generator 119 and used by the camera signal processing circuit 4 as well, counting such signals, and indicating the position of the video signal in a picture which is outputted from the camera signal processing circuit 4, a subtractor 108, an address counter 109 for generating a write address for writing of data to the memory 16, selectors 110 and 114, a command decoder 111 for generating, in accordance with an input command, a control signal for controlling individual parts, a location register 113 for storing the aforesaid location data on each area, a color table 115 which retains the color table data and which outputs a color video signal corresponding to image data read out from the memory 16, a D/A converter 116 for effecting D/A (digital-to-analog) conversion of the output of the color table 115 to form a title image signal, and a character display part 117 for receiving from the control part 11 display data which will be described later and displaying a character image in an electronic viewfinder (EVF) which is not shown.

The external storage part 8 includes the ROM 9, the microcomputer 118 and the serial port 120, and the ROM 9 is connected to the microcomputer 118, which is in turn connected to the serial port 120. The output of the serial port 120 and the reset terminal of the microcomputer 118 are connected to the body 1 via the connection part 10. The connection part 10 is also provided with terminals ID0 and ID1 which are used for determining whether the external storage part 8 is attached. The terminals ID0 and ID1 are respectively connected to an electric power source and a ground terminal within the external storage part 8. Each signal line passed through the connection portion 10 is connected to the serial port 102 or the parallel port 105 of the control part 11. The serial port 102, the serial port 103, the serial port 104 and the parallel port 105 are connected to and controlled by the microcomputer 101. The output of the serial port 104 is supplied to the EVF through the character display part 117 so as to provide a display indicative of the selection, movement and non-movement of a title. The serial port 103 is connected to the serial port 112 of the image generating part 15.

FIG. 4 is a flowchart showing the operations of the microcomputers 101 and 118 of the present embodiment, and the operation of the present embodiment will be described below with reference to FIGS. 3 and 4.

For simplification of explanation, the microcomputers 101 and 118 are hereinafter referred to as an "MC1" and an "MC2", respectively. The two microcomputers 101 and 118 communicate data therebetween via the serial ports 102 and 120, and the flow of the data is shown by each dashed line in FIG. 4.

The MC2 (118) starts its operation in Step 220 and, in Step 221, stops the operation until a reset signal is sent from the MC1 (101). The MC1 (101) starts its operation in Step 201 and, in Step 202, waits for a switch SW1 (12) to be pressed. When the switch SW1 (12) is pressed, the signals provided at the terminals ID0 and ID1 are inputted to the MC1 in Step 203. Subsequently, Steps 203 and 204 are repeated until ID0 = 1 and ID1 = 0 are obtained in Step 204. Since the terminals ID1 and ID0 are connected to the electric power source and the ground terminal in the interior of the external storage part 8 shown in FIG. 3, the attachment of the external storage part 8 is detected. If the answer is YES in Step 204, the MC1 (101) sends a reset signal to the MC2 (118) in Step 205. As described above, in Step 221, the MC2 (118) receives the reset signal to start the operation and, in Step 222, sends out an identification number for identification of the kind of the external storage part 8. In Step 206, the MC1 (101) receives the identification number and, in Step 207, determines whether the identification number is an identification number to be used in a camera according to the present embodiment. If the identification number does not match the camera, the character display part 117 provides an error display to the effect that the identification number does not match, and the process is brought to an end in Step 209. If it is determined in Step 207 that the identification number matches the camera, the process proceeds to Step 210, where the character display part 117 displays in the EVF an instruction to select a title number.

Then, it is determined in Step 211 whether a switch SW3 (14) is on. If the switch SW3 (14) is not on, it is determined in Step 212 whether the switch SW2 (13) is on. If the switch SW2 (13) is on, the title number is switched to another title number in Step 213. If the switch SW2 (13) is not on, the process returns to Step 211. In Steps 211 to 213, an arbitrary title number is selected by the switches SW2 (13) and SW3 (14) in the above-described manner. If it is determined in Step 211 that the switch SW3 (14) has been turned on, the process proceeds to Step 214, where the title number is sent out. In Step 223, the MC2 (118) receives the title number and determines a read start address of the ROM 9. In Step 224, the MC2 (118) sends out area image data on each area of a specified title. The MC1 (101) receives the area image data in Step 215 and transfers them to the image generating part 15. The MC2 (118) sends out the color table data in Step 225 and sends out location data indicative of a display position in Step 226. In Step 227, the process is completed. The MC1 (101) receives such data in Steps 216 and 217 and sequentially transfers them to the image generating part 15. Thereafter, in Step 218, the MC1 (101) instructs the image generating part 15 to initiate a display. The process is completed in Step 219.

The operation of the image generating part 15 will now be described.

In Step 215 for the MC1 (101), the selector 110 is connected to a side leading to the address counter 109, and the selector 114 to a side leading to the serial port 112 in accordance with an instruction sent from the command decoder 11, and the area image data are inputted into the selector 14 through the serial port 112. The area image data are sequentially written to the memory 16 via the selector 114 and the write addresses of the memory 16 are simultaneously outputted from the address counter 109.

The area image data are inputted from the serial port 112 in the order: the area 1, the area 2, the area 3 and the area 4, and the address counter 109 sequentially outputs vertical and horizontal addresses of each area. If h represents the number of pixels in each area in the horizontal direction and v represents the number of pixels in each area in the vertical direction, each address of the memory 16 consists of the leftmost two bits representing address data indicative of an area number, a horizontal address of H(1) to H(h), and a vertical address of V(1) to V(v). Each time 1-bit data on each pixel is inputted into the serial port 112, the address counter 109 increments the horizontal address by one. When the horizontal address reaches H(h), the address counter 109 returns the horizontal address to H(1) and increments the vertical address by one. The above-described operation is repeated for each area until H(h) and V(v) are reached, and the leftmost two bits representing the address data are incremented. The thusobtained image data on each area is stored in the memory 16 as shown in FIG. 2(c).

In Step 216 for the MC1 (101), the color table data are written to the color table 115. The color table data consist of data obtained by digitizing specified colors for the four areas and RGB levels corresponding to a color derived from a combination of the four specified colors. The color table data are sequentially written into memory regions specified by 4-bit addresses in the color table 115.

In Step 217 for the MC1 (101), location data $(X_1, Y_1)$ to $(X_4, Y_4)$ on the respective areas are sequentially written to the location register 113. If an instruction to initiate a displaying operation is given in Step 218 for the MC1 (101), the selector 110 is connected to a side leading to the subtractor 108, while the selector 114 is connected to a side leading to the color table 115. The H-V counter 107 receives an oscillation output from the oscillator 106 and a horizontal synchronizing signal H and a vertical synchronizing signal V from the synchronizing signal generator 119, and generates a count signal indicative of the position in a picture at each timing of a video signal supplied from the camera.

If X0 represents the number of pixels in one picture in the horizontal direction and Y0 represents the number of pixels in the vertical direction, each time a clock is inputted from the oscillator 106 to the H-V counter 107, the H-V counter 107 increments horizontal position data Px. When the horizontal position data Px reaches Px (X0), it is reset to Px (1) by a horizontal synchronizing signal. In the meantime, vertical position data Py is incremented each time a horizontal synchronizing signal is inputted, and when the vertical position data Py reaches Py (Y0), it is reset to Py (1) by a vertical synchronizing signal.

The subtractor 108 generates the read addresses of the respective areas in the memory 16. More specifically, as for the $i^{th}$ area (i = 1, 2, 3 or 4), H (Px-Xi) and V (Py -Yi) are outputted as a horizontal address H and a vertical address V, respectively. At this time, an address which is identical to the address which was assigned to the leftmost two bits during a write operation is added to each area.

Accordingly, four kinds of address data which are outputted from the subtractor 108 are supplied to the memory 16 as read addresses. When the respective horizontal and vertical position data Px and Py reach Px (Xi+1) and Py (Yi+1), reading is initiated at the addresses H1 and V1 of each area. At this time, if the horizontal read address of each area is outside of the range 1 to h or the vertical read address of the same is outside of the range i to v, it is determined that a corresponding address is absent and the position data Px and Py are outside of each area. Accordingly, the memory 16 outputs "0".

In the above-described manner, 4-bit parallel data is read from the memory 16, and the 4-bit parallel data is inputted as an address of the color table 115. The color table 115 outputs RGB levels corresponding to the 4-bit address. If every bit of the 4-bit address is "0", RGB levels corresponding to black are outputted.

With the above-described arrangement, although the capacity of the memory 16 is relatively small, it is possible to display a variety of titles.

In the above-described embodiment, it is possible to easily achieve the function of moving a title image displayed in a picture by incrementing or decrementing the location data Xi and Yi on a desired area by means of the microcomputer 101 with the passage of time. In addition, it is possible to easily implement the function of changing a displayed color by switching the color table data by means of the microcomputer 101 with the passage of time.

As is apparent from the foregoing description, in accordance with the present embodiment, it is possible to provide a video system which can produce a variety of combined images while retaining its memory capacity to a minimum extent.

What is claimed is:

1. A video system, comprising:
   (a) an auxiliary unit including a memory for storing image data corresponding to an area occurpying a portion of one picture and location data indicative of the location of the image data in the one picture; and
   (b) a primary unit to which said auxiliary unit is removably secured, the primary unit including inputting means for inputting a first video signal, memory means for storing the image data, forming means for forming a second video signal by reading out the image data from said memory means at a timing according to the location data, and combining means for combining the first video signal with the second video signal.

2. A system according to claim 1, wherein said inputting means includes a video camera, said forming means operating in accordance with the operation of said video camera.

3. A system according to claim 2, further comprising recording means for recording on a recording medium a video signal outputted from said combining means.

4. A system according to claim 1, wherein said memory stores a plurality of image data each corresponding to an area occupying a portion of the one picture and a plurality of location data indicative of the respective locations of the plurality of image data in the one picture, said forming means forming a video signal in which the plurality of image data are combined in accordance with the plurality of location data.

5. A system according to claim 1, wherein the image data is binary image data.

6. A system according to claim 5, wherein said memory further stores color data indicative of a color relative to the binary image data.

7. A system according to claim 1, wherein said memory stores a plurality of binary image data each corresponding to an area occupying a portion of the one picture, a plurality of location data indicative of the respective locations of the plurality of binary image data in the one picture, and a plurality of color data indicative of colors relative to the respective binary image data.

8. A system according to claim 7, wherein said forming means is capable of forming a video signal containing a plurality of colors respectively corresponding to the plurality of color data and a color corresponding to a combination of the colors.

9. A video system, comprising:
   (a) a memory for storing a plurality of image data each corresponding to an area occupying a portion of one picture and a plurality of location data indicative of the respective locations of the plurality of image data in the one picture;
   (b) inputting means for inputting a first video signal;
   (c) forming means for forming a second video signal according to the plurality of image data and the plurality of location data, said forming means including a memory circuit for storing the plurality of image data and forming the second video signal by reading out the plurality of image data from the memory circuit at timings according to the plurality of location data; and (d) combining means for combining the first video signal with the second video signal.

10. A system according to claim 9, wherein said inputting means includes a video camera, said forming means operating in accordance with the operation of said video camera.

11. A system according to claim 10, further comprising recording means for recording on a recording medium a video signal outputted from said combining means.

12. A system according to claim 9, wherein said memory further stores a plurality of color data indicative of respective colors relative to the plurality of image data.

13. A system according to claim 12, wherein said forming means is capable of forming a video signal containing a plurality of colors respectively corresponding to the plurality of color data and a color corresponding to a combination of the colors.

14. A video system, comprising:
  (a) a memory for storing a plurality of binary image data each corresponding to an area occupying a portion of one picture, a plurality of location data indicative of the respective locations of the plurality of binary image data in the one picture and a plurality of color data indicative of respective colors relative to the plurality of binary image data;
  (b) inputting means for inputting a first color video signal;
  (c) forming means for forming a second color video signal which contains a plurality of colors respectively corresponding to the plurality of color data and a color corresponding to a combination of the colors and in which the plurality of image data is combined in accordance with the plurality of location data; and
  (d) combining means for combining the first color video signal with the second video signal.

15. A system according to claim 14, wherein said inputting means includes a video camera, said forming means operating in accordance with the operation of said video camera.

16. A system according to claim 15, further comprising recording means for recording on a recording medium a video signal outputted from said combining means.

* * * * *

UNITED STATES PATENT AND TRADEMARK OFFICE
CERTIFICATE OF CORRECTION

PATENT NO.   : 5,175,624
DATED        : December 29, 1992
INVENTOR(S)  : Teruo Hieda, et al.

It is certified that error appears in the above-identified patent and that said Letters Patent is hereby corrected as shown below:

| | |
|---|---|
| Col. 3, line 24 | Change "states" to -- state -- |
| Col. 3, line 68 | After "2(d)" insert -- , 2(e) and 2(f) -- |
| Col. 6, line 37 | Change "11" to -- 111 -- |
| Col. 6, line 38 | Change "14" to -- 114 -- |
| Col. 6, line 61 | Change "thusobtained" to -- thus obtained-- |
| Col. 7, line 60 | Change "decrementing" to --decreasing -- |
| Col. 8, line 7 | Change "occurpying" to --occupying-- |

Signed and Sealed this

Twenty-third Day of November, 1993

Attest:

BRUCE LEHMAN

Attesting Officer       Commissioner of Patents and Trademarks